United States Patent [19]

Palomba

[11] Patent Number: 4,784,111
[45] Date of Patent: Nov. 15, 1988

[54] HOT AIR RECYCLING OVEN

[76] Inventor: Joseph Palomba, 32, rue Gabriel Lelong, Chartres 28000, France

[21] Appl. No.: 807,069
[22] PCT Filed: Mar. 21, 1985
[86] PCT No.: PCT/FR85/00056
   § 371 Date: Nov. 13, 1985
   § 102(e) Date: Nov. 13, 1985
[87] PCT Pub. No.: WO85/04308
   PCT Pub. Date: Oct. 10, 1985

[30] Foreign Application Priority Data

Mar. 27, 1984 [FR] France .................................. 84 04978

[51] Int. Cl.$^4$ .................................................. F23M 7/00
[52] U.S. Cl. ..................................... 126/190; 126/194; 126/19 R; 126/337 R; 126/273 R; 49/371
[58] Field of Search .............................. 126/190–194, 126/197, 198, 273 R, 273 A, 274, 276, 19 R, 19 M, 337 R, 337 A, 339; 49/169, 171, 371; 160/180; 99/448, 467; 312/292

[56] References Cited

U.S. PATENT DOCUMENTS

| | | | |
|---|---|---|---|
| 1,944,061 | 1/1934 | Beverly | 126/190 |
| 2,130,617 | 9/1938 | Dockham | 312/292 |
| 2,661,507 | 12/1953 | South | 49/371 |
| 4,355,570 | 10/1982 | Martin et al. | 99/467 |

FOREIGN PATENT DOCUMENTS 1173837 10/1958 France .
2529443 1/1984 France .

Primary Examiner—Samuel Scott
Assistant Examiner—Noah Kamen
Attorney, Agent, or Firm—Laff, Whitesel, Conte & Saret

[57] ABSTRACT

An oven especially—but not exclusively—for baking French bread has a single loading opening which is closed by a principal door having a fill opening therein which, in turn, is closed by a series of small longitudinal, superimposed folding doors. One edge of each folding door covers the adjacent edge of the folding door immediately next to it. The small doors either pivot over an arc 180° or slide laterally. The back of the oven may be equipped with a set of doors, such as the small doors. A gap separates the front edge of plates for supporting the bread and the plane of the interior side of the small doors. The plates are relatively thin, movable perforated sheets. The ends of a latch or hook-up bar may slide into supports on the stiles of the loading opening or be held in struts provided on each side of the small doors.

8 Claims, 3 Drawing Sheets

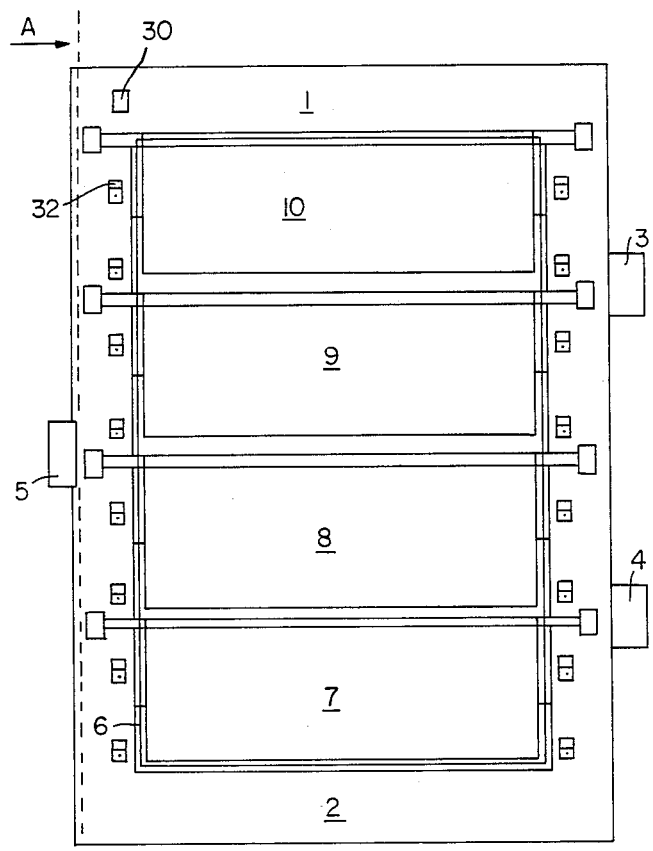
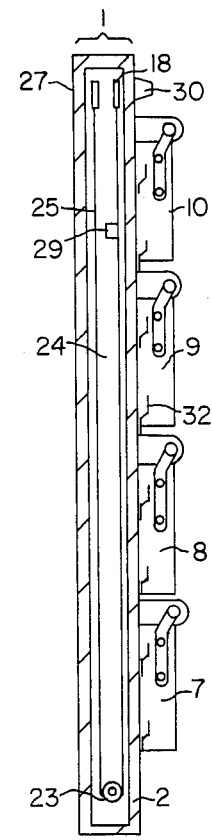
FIG.1  FIG.2
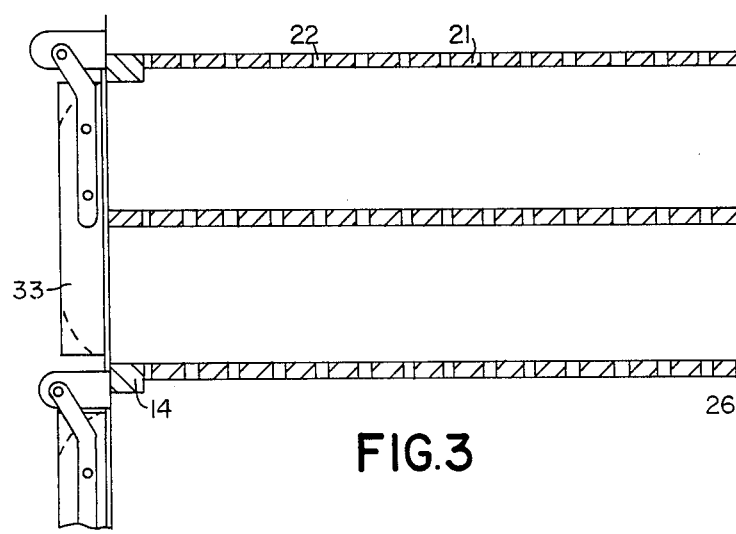
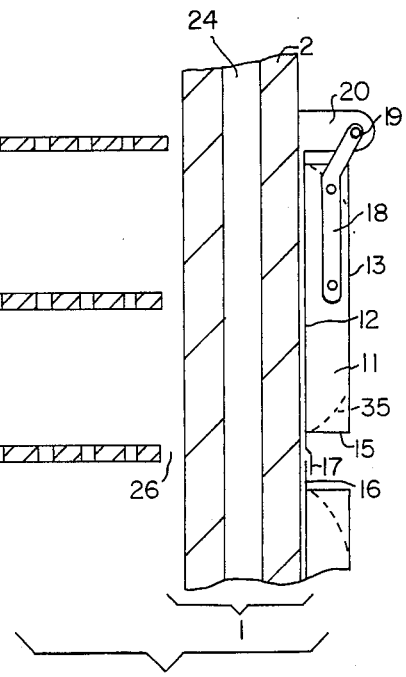
FIG.3

HOT AIR RECYCLING OVEN

BACKGROUND OF THE INVENTION

The present invention concerns a type of recycle hot air oven such as those used by bakers, pastry-cooks, pork-butchers and restaurant owners for cooking food products.

In the baking of bread using the Roman oven principle, the dough is laid bare on a hot plate. The great proportion of present day ovens still use this principle, with improvements focusing primarily on continuous heating and on the ease of putting bread into the oven and taking it out of the oven.

With the exception of trolley type ovens, the structures of bread ovens have become only slightly lighter. Their bulkiness on the ground has not been reduced and their immobility is usually by anchoring to the ground.

SUMMARY OF THE INVENTION

A first object of the invention is to improve these three attributes, lightweight, bulkiness on the ground, and mobility while keeping the traditional baking advantages and by introducing decided advantages on handling the transfer of bread.

In known superposed hot plate ovens, the front face has superposed longitudinal openings which are closed by doors at different levels, the first plate generally being at 70 to 80 cm above ground and the height of the doors being of the order of 26 cm. As it is difficult and almost impossible to put bread into and take out of an oven at more than 1.80 m above ground, it is practically impossible to provide more than three doors. Furthermore, it is difficult to clean the inside and the back of the oven because there is a lack of accessibility. Finally, the size and nature of the food products are limited, by excluding the products having a height greater than one door. The height of products which are very close to that of one door, experience difficulties on removal when there is a rising of dough due to baking, which is a perfectly random event.

Another object of the present invention consists in providing an oven having an inside which is easily accessible, and which allows the baking of large size products.

In accordance with a characteristic of the invention, a principal door closed by a set of superposed secondary folding doors is provided as an opening to put bread into the oven. The lower edge of a secondary folding door covers the upper edge of a secondary folding door which is immediately below it, the closing being in a sufficiently tight manner.

In accordance with another characteristic, the perimeter of the opening to put bread into the oven is made up by the fold of a principal door pivoting on two vertical axes.

In accordance with another characteristic, the secondary doors can pivot 180° about their axes, these being attached on the fold of the principal door.

In accordance with another characteristic, the axes of the secondary doors are placed at a high position for a secondary door and at a low position for the closest secondary door, the secondary opening thus being doubled.

In accordance with another characteristic of the invention, a free space is provided between the edge of each plate and the concave back of the secondary door.

In accordance with another characteristic, a gap is provided between the front edge of each plate and interior face of the principal door.

In accordance with another characteristic, the plates are movable and are made of sheet metal having 3 mm holes on 40 to 60 % of its surface.

In accordance with another characteristic, a hook-up bar for an apparatus to put bread into the oven is installed along the thickness of the principal door mounts, the bar sweeping the entire opening of the principal door.

In accordance with another characteristic, upwardly open U-shaped stirrups are put at various positions on the secondary door, which is bound to the principal door.

BRIEF DESCRIPTION OF THE DRAWINGS

The characteristics of the above-mentioned invention, as well as others, will become clearer upon reading the description of an embodiment, the description being made in relation to the attached drawings, among which:

FIG. 1 is a front view of the principal door of an oven in accordance with the invention, FIG. 2 is a vertical sectional view, taken along line A—A, of the principal door shown in FIG. 1, FIG. 3 is a vertical sectional view, taken along line A—A of FIG. 1, of a part of the oven corresponding to a portion of the front principal door and to a back door (or set of doors), FIG. 9 shows an embodiment having sliding doors and incorporating the principles of the invention.

DESCRIPTION OF THE PREFERRED EMBODIMENTS

Figure 4:
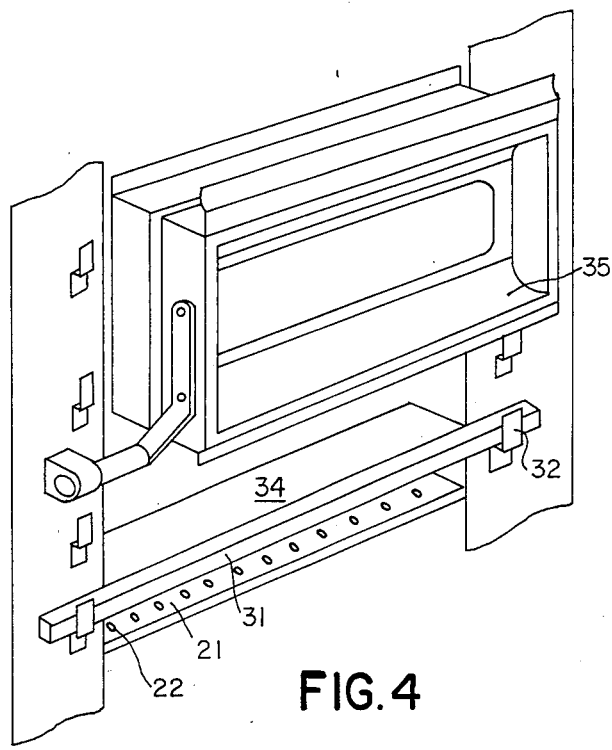
FIG. 4 is a perspective view of two secondary front doors, the lower secondary door being open, and the bar of a loading system fitting into the support stirrups bound to the principal door.

In FIG. 1, we have shown by itself the principal door 1 of an oven. The door 1 has a rectangular frame 2 with, two hinges 3 and 4 on one vertical side and, a locking system 5 on the other side. The frame 2 delimits a rectangular opening 6 in the principal door 1. The opening 6 is sealed by four folding panels of secondary doors 7 to 10. The folding panels of secondary doors 7 to 10 have a rectangular shape and a width which is greater than the width of the opening 6. The contour or lateral side 11 of doors 7 to 10, shown in FIGS. 3 and 4, has the general shape of a rectangle. When the doors 7 to 10 are closed, that is vertical, their internal sides 12 and external sides 13 are themselves vertical. The upper extension 16 of the internal side 12 is covered by the lower extension 17 of the internal side 12 belonging to the secondary door immediately above.

The lower parts of the metallic hinges 18 are attached to the upper part of the two vertical sides 11 the secondary doors 7 to 10. The upper parts of the off-set brackets or hinges 18 are offset or bent towards the exterior in order to allow the passage of the rotating axes 19, and to allow the opening or space between the panels at the upper edges of the hinges 18 of each secondary door to be greater than the width of each door. The rotation of the second doors is done around the axes 19 bound by the hinges 18 supported by pillow-blocks mounted on the stile of the frame of the principal door 1. We observe that the straight sections of hinges 18, which corresponds to a slight offset between the axes 19 and the front of the door 1, causes the secondary doors 7 to 10 to lie flat against door 1 when they are vertical.

Figure 5:
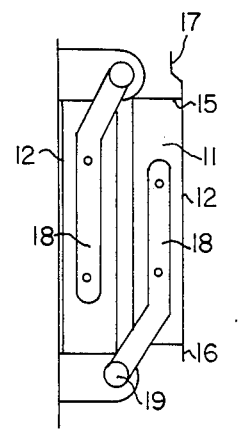
FIG. 5 is a profile view of the secondary doors shown in FIG. 4, FIGS. 6 and 7 are views of the vapor duct closing system.

FIGS. 4 and 5 illustrate the lifting of a lower secondary door which folds over against the secondary door immediately above it, which frees an opening to put bread into the oven. The height of the bread may be equal to the height of the secondary door.

In variation, an alternating position for the hinges of two neighboring secondary doors (high position for the first door, low position for the second door) allows the pivoting axes to be separated by twice the height of the secondary doors.

We observe in FIG. 3 that the doors 7 to 10 have a height such that each door serves two levels of the oven plates 21, the height of each level being equivalent to half that normally used in a bakery. In the alternating hinge version, the simultaneous opening of two neighboring secondary doors gives access to four levels or plates 21.

The doors 7 to 10 following one another in an uninterrupted manner together occupy a strict minimum oven height. Since there is no partition between the doors 7 to 10, there is a reduction in the height of each level to approximately 10 cm, this corresponding to a secondary door height of approximately 20 cm. Thus, the highest plate is at a practical height of 1.5 m. Since the doors 7 to 10 open at an angle of 180° towards the outside, there is little or no risk of being burned when putting bread into the oven and taking it out of the oven, because the total clearance of the openings is achieved during the access to the two or four plates.

The height of the door or door-frame 1 is in the order of 50 mm. An uninterrupted stream of air is created, which spreads over the whole area covered by the secondary doors 7 to 10. The stream of air corresponding to the concavity 35 of each of the secondary doors is added to this air stream.

The plates 21, FIG. 3, are thin metal sheets, preferably with regularly distributed holes 22 on their surfaces. The holes 22 have a diameter of approximately 3 mm. The area of the holes 22 represents, for example, from 40 to 60% of the total area of a plate. Thus, the thermal inertia of each plate is small and the bread is better heated from under the plates. The plates 21 are movable. There may be a gap between their frontal edge and the internal side of the door 1 to further increase the hot air stream along the door.

In the loading system shown in FIG. 2, which is installed behind the secondary doors 7 to 10, the ends of a latch or hook-up or bar 29 slide in two vertical sides provided inside the frame stile 2 of the principal door 1. The ends the latch or hook-up bar 29 have hooks which are bound to the ends of a movable cable 25 slung on return pulleys 23, 27 and 28. The cable 25 motion control mechanism 30 is placed on the external side of the principal door 1, preferably at the level of pulley 28. This control mechanism 30 may be either manual or electrical.

In the loading system shown in FIG. 4, in front of the second doors 7 to 10, the ends of a latch or hook-up bar 31 are extended by a latch or hook-up side 34 having a width that is slightly narrower at the opening of the principal door. The ends of bar 31 are in the upside opening of U-shaped stirrups 32 which are affixed to the stiles of the principal door 1.

Third doors 33 are symmetrical to the second doors, and may be provided at the back of the oven to give it the characteristics of a cross oven. They would be provided with sealed joints 14 and a mechanism allowing their opening to occur only when the secondary doors are closed, this mechanism being itself tied to the vapor duct control mechanism shown in FIGS. 6 and 7.

A vapor duct 43 or muffle is provided inside the door. It is closed by a settable moving disk 38 pivoting about a vertical axis 39, the disk lying on a conical valve 36 provided with holes 37. A manual or electrical command 40 puts into motion a pulley or cam 42 to which is tied the cable or the rod 39, which causes the downward or upward motion of the disk-valve setting system. The holes 37 of the valve can be aligned with the holes 44 of the setting disk by rotating the disk.

Figure 6:
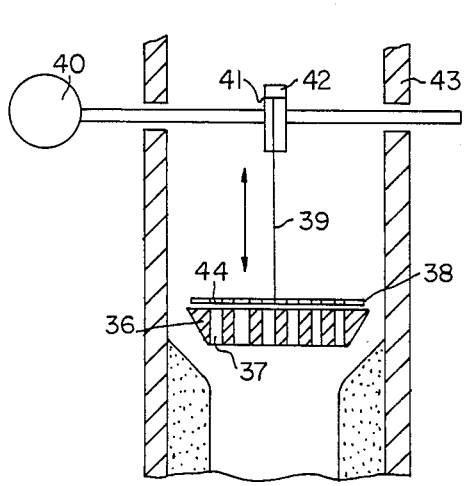
Figure 7:
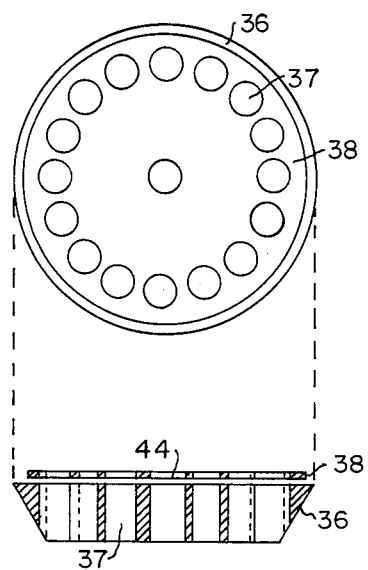
Figure 8:
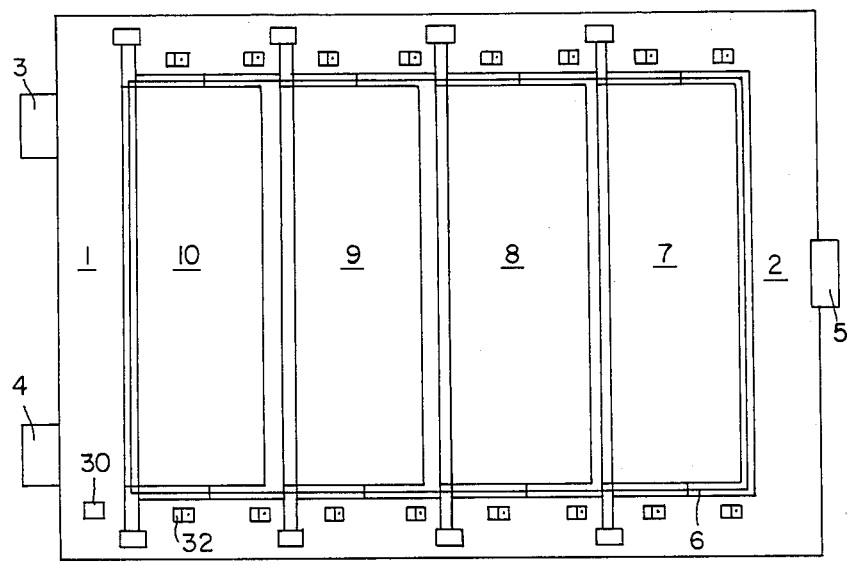
FIG. 8 is the same as FIG. 1, but rotated by 90° to show vertically pivoted doors.

The system shown in FIGS. 6 and 7 can be used to efficiently control the amount of humidity in the oven. In fact, French bread is characterized by its bare cooking directly on a hot plate in a saturated humid atmosphere. It is necessary to control the humidity level because excess vapor hinders the proper development of the bread during baking and a risk of overcoming the bake house. This risk is genuine considering the amount of vapor generated by the bread itself during baking and the sealed nature of present day ovens with metal sides.

In other respects, the control of the humidity level allows the baking of other than French bread, without requiring the addition of vapor.

For this purpose, the combination of valve 36 and disk 38 can be reduced, the holes 44 of disk 38 not being aligned with the holes 37 of valve 36 and, in this case, the vapor duct is completely closed.

If we place the 36–38 combination in the high position, with the holes 37 and 44 aligned, we guarantee the maximum opening of the vapor duct. Between these two extreme positions, we can select intermediate positions, either in height, or in the angular position of the disk, to obtain the required flow of vapor.

FIG. 9 shows an embodiment having sliding doors 7′, 8′, 9′. The remaining parts are substantially the same as parts having similar reference numbers, in other figures.

The embodiments of the invention in which an exclusive property or privilege is claimed are defined as follows:

1. An oven for baking food products, said oven comprising a single loading opening which is closed by a principal door with hinge means having a vertical pivot axis located adjacent an edge of said door, said principal door having a filling opening closed by a vertically aligned series of small longitudinal folding doors extending across the width of the principal door, off set hinge means for pivotally supporting an edge of each of the small longitudinal folding doors about 180° toward the front and along a horizontal axis located forwardly of said door, the opposite edge of each of said folding doors covering in a practically sealed manner an adjacent edge of the folding door which is immediately next to it.

2. An oven in accordance claims 1 wherein there are a plurality of said hinge means, the horizontal rotational axis of one of said small longitudinal folding doors being on a first of said hinge means at an upper edge of the one folding door and the horizontal rotational axis of a neighboring folding door being on a second of said hinge means below said one folding door.

3. An oven for baking food products, said oven comprising a single loading opening closed by a vertically pivoted principal door having hinge means for providing pivot points located adjacent an edge of said principal door, said principal door having therein a filling opening closed by an aligned series of small longitudinally superimposed doors which extend across the width of the principal door a plate having extensions projecting therefrom, an off set hinge means pivotally coupled between said plate and said principal door, the extensions being located along one edge of each small door for covering in a practically sealed manner the adjoining edge of a neighboring small door which is immediately next to it when said small doors are closed, the perimeter of the said filling opening including at least part of an edge of a principal door.

4. An oven for baking food products, said oven comprising a single loading opening closed by a principal door having a hinge along one vertical edge thereof and further having therein a filling opening closed by an aligned series of small vertically pivoted longitudinal folding doors extending across the width of the principal door, an edge of each folding door covering in a practically sealed manner the space between it and the next adjacent neighboring door, the perimeter of the loading opening including at least part of an edge of the principal door, a cable extending through a channel adjacent said series of longitudinal folding doors, and hook-up bar means carried by said cable means latching said longitudinal folding doors.

5. An oven in accordance with any one of the claims 1, 3, and 4 and a plurality of plates for supporting products in the oven, there being a gap between a front edge of each plate and the interior side of the small doors.

6. An oven in accordance with any one of claims 1, 3, and 4 wherein there are a plurality of plates for supporting products in the oven, and a gap between a front edge of the plates and the interior side of the principal door.

7. An oven in accordance with claim 5 wherein the plates are relatively thin uniformly perforated plates, the perforations generally having a diameter of the order of 2 to 3 mm, the total area of the perforations being approximately 40 to 64% of the total area of the plates.

8. An oven in accordance with claim 5 wherein the plates are movable.

* * * * *